United States Patent [19]
Stites

[11] Patent Number: 4,739,179
[45] Date of Patent: Apr. 19, 1988

[54] SYSTEM FOR GENERATING POWER BY VEHICLE MOVEMENT AND METHODS OF CONSTRUCTING AND UTILIZING SAME

[76] Inventor: Howard A. Stites, 1368 Stanley Ave., Pontiac, Mich. 48055

[21] Appl. No.: 26,965

[22] Filed: Mar. 17, 1987

[51] Int. Cl.$^4$ .............................................. F04B 35/00
[52] U.S. Cl. .................................................. 290/1 R
[58] Field of Search ............. 290/1 R, 1 A, 1 C, 4 D, 290/43, 52, 54

[56] References Cited

U.S. PATENT DOCUMENTS

| | | | |
|---|---|---|---|
| 4,238,687 | 12/1980 | Martinez | 290/1 R |
| 4,239,975 | 12/1980 | Chiappetti | 290/1 R |
| 4,409,489 | 10/1983 | Hayes | 290/1 R |
| 4,434,374 | 2/1984 | Lundgren | 290/1 R |
| 4,437,015 | 3/1984 | Rosenblum | 290/1 R |

*Primary Examiner*—William M. Shoop, Jr.
*Assistant Examiner*—W. E. Duncanson, Jr.
*Attorney, Agent, or Firm*—Irving M. Weiner; Joseph P. Carrier; William D. Blackman

[57] ABSTRACT

A system for generating power by vehicular movement having treadle plates upon which a vehicle overpasses. Treadle plates are pivotally fitted to the top of the vertical shafts. Resilient, compressible bladders are each fitted with an inlet and an exhaust, pressure plates for compressing the bladders, a series of connecting links, fulcrums, levers and arms, directly or indirectly attached to the lower portion of the vertical shafts and also to the pressure plates, and a generating means for converting the compressed fluid into electricity. As the vehicle overpasses the treadle plates, the vertical shafts are forced downwardly, and, accordingly, force is applied to the upper and lower plates via the linking system, thus compressing the bladder and the working fluid therein. The compressed fluid is then driven through pipelines into the generator, causing the production of power. In an alternate embodiment, cylinders and pistons are substituted for the bladders, and upon the overpass of a vehicle, the vertical shafts are forced downward, the pistons are forced into the cylinders, and the resulting compressed fluid is expelled to the generating means.

22 Claims, 3 Drawing Sheets

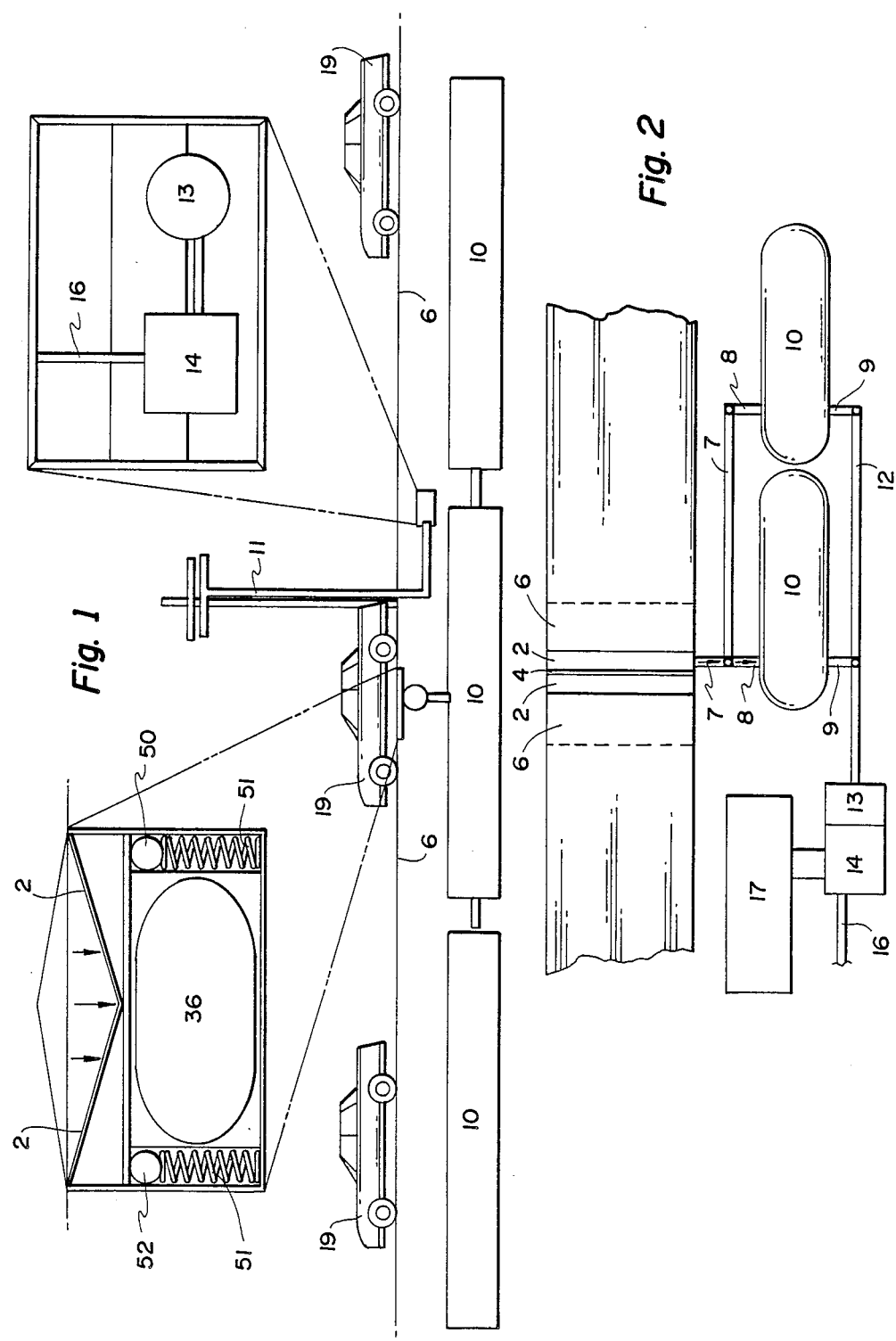

SYSTEM FOR GENERATING POWER BY VEHICLE MOVEMENT AND METHODS OF CONSTRUCTING AND UTILIZING SAME

BACKGROUND OF THE INVENTION

1. Field of the Invention

This invention relates to a method and apparatus for generating power from vehicle and pedestrian traffic. More particularly, the invention relates to a method and apparatus for utilizing the weight of moving highway and railway traffic to compress fluid and for recovering energy from fluid so compressed.

2. Description of the Relevant Art

The relevant art is described hereinbelow.

U.S. Pat. No. 4,238,687, issued in 1980 to Martinez, entitled "HIGHWAY TURBINE", discloses an apparatus for generating power and mounted in a roadbed. The apparatus includes rocker plates connected by linkages to one or more turbine wheels, and a generator which is operated by the turbine wheels via a common shaft. As a vehicle passes over the apparatus, the rocker plates are forced to move in a substantially vertical direction, thus rotating the turbine wheels and causing the generation of electricity.

U.S. Pat. No. 4,409,489, issued in 1983 to Hayes, entitled "ROAD TRAFFIC ACTUATED GENERATOR", discloses an apparatus for generating power including a network of resilient, fluid-containing tubes laid over a roadway and attached to a turbine generating system. As a vehicle passes over the tubes, the working fluid is pumped through the tubes and into the turbines, thereby causing the generation of electricity.

U.S. Pat. No. 4,434,374, issued in 1984 to Lundgren, entitled "DEVICE FOR GENERATING ELECTRICITY BY PEDESTRIAN AND VEHICULAR TRAFFIC", discloses an apparatus for generating electricity which is comprised of a roadway or a sidewalk tread plate capable of substantially vertical motion, a series of rocker arms communicating with a common shaft, and a generator operated by the common shaft. As pedestrian or vehicular traffic overpasses the tread plate, its consequent downward motion depresses the rocker arms, which in turn rotate the common shaft, thereby generating electricity.

Japanese Patent No. 52-8411, issued in 1977 to Kanji Sato, entitled "RUNNING ROAD POWER GENERATING STARTING DEVICE", discloses an apparatus for generating electricity. The apparatus includes: a series of treadle plates capable of substantially vertical motion; vertical shafts fitted with gear teeth; gears communicating with the gear teeth; a power generator; and shafts connecting the gears with the generator. As a vehicle passes over the treadle plates, the vertical shafts move downwardly, causing the gear to turn and thereby rotating the connecting shafts to operate the generator.

These relevant art devices are deficient in certain respects. Their designs are inefficient in that, in each case, only the downward force of the weight of a vehicle on a treadle or fluid tube is recovered. Accordingly, their placement on the roadway, to be efficient, must of necessity be unnecessarily intrusive to the overflow of vehicle traffic. This intrusion causes an unsteady ride and results in the discomfort of passengers.

For a more specific example of the deficiencies inherent in the relevant art devices, the network of collapsible bodies disclosed by Hayes pressurize a working fluid when a vehicle overpasses the collapsible bodies. Besides embodying the disadvantages discussed above, this design discloses a temporary, flexible device which is exposed entirely to the elements and to the direct overpass of highway vehicles of varying shapes and weights, thus subjecting it to considerable strain and excess fatigue. The Hayes apparatus is further incapable of application to transport systems which are of considerably greater mass, such as vehicles which operate on rail systems.

The present invention effectively overcomes the deficiencies attendant the known art.

SUMMARY OF THE INVENTION

The present invention provides one or more resilient, compressible bladders, each fitted with an inlet and an exhaust, where the inlet allows for the intake of working fluid through a one-way valve and where the exhaust allows for the expulsion of the working fluid through a one-way valve. Above and below the bladder or bladders are fitted pressure plates which compress the bladder or bladders by the downward movement of the upper plate and the upward movement of the lower plate. A pair of treadle plates hingedly fitted together at a point elevated above the road's surface is coupled at their hinge points with one or more vertical shafts capable of vertical movement. The lowest point of the vertical shafts are coupled, directly or indirectly, with a plurality of levers, fulcrums, connecting links and arms which are fixed, directly or indirectly, to the upper and lower plates. A compressible spring means is fitted between the lower portion of the vertical shaft and the floor of the housing trough to slightly resist depression of the vertical shaft as vehicles overpass the treadle plates and to return the device to its resting position.

The compressed fluid is stored in a tank for holding pressurized fluid. From the pressurized storage tank the fluid then proceeds to the generating means. The movement against the collapsible, resilient bladders pressurizes the working fluid. The bladders are partially collapsible so as to expel enough fluid into the storage tank to maintain constant pressure therein. The bladders are resilient so as to intake additional working fluid after the pressure of the upper and lower plates is removed.

In another embodiment, the bladder means is substituted with a plurality of conventional cylinders and pistons, with each cylinder including a one-way inlet and one-way outlet valve. The in and out movement of the pistons pressurize the working fluid which, after being expelled through the exhaust valve, enters the storage tank to maintain a constant pressure therein.

It is an object of the present invention to design and produce an energy recovery system which translates the downward force of a moving vehicle into both an upward force and a downward force, thus minimizing the downward movement required to generate electricity and, hence, the intrusiveness of the device.

Another object of the present invention is the design and production of an energy recovery device which provides minimal resistance to vehicle traffic.

A further object of the invention is to provide a permanent, resilient structure which is capable of withstanding continuous operation with minimal wear.

Yet another object of this invention is the design of an energy recovery device capable of translating the weight of vehicles of great mass, such as vehicles riding on rail systems, into mechanical and electrical power.

The above and other objects, advantages and features of the present invention will become more apparent from the following detailed description, when read in conjunction with the accompanying drawings.

BRIEF DESCRIPTION OF THE DRAWINGS

FIG. 1 is a schematic elevational view indicating the relationship between overpassing vehicles, the highway, and the position of the invention in relation to the highway, and further details the general principles underlying the invention and the turbine or motor in relation to the generating means and the power grid;

FIG. 2 is a combined top and schematic view of the treadle plates on a vehicle surface and a representation of the basic principle for generating electric power from the overpassing motion of a moving vehicle, according to the invention;

DETAILED DESCRIPTION OF THE INVENTION

Figure 3:
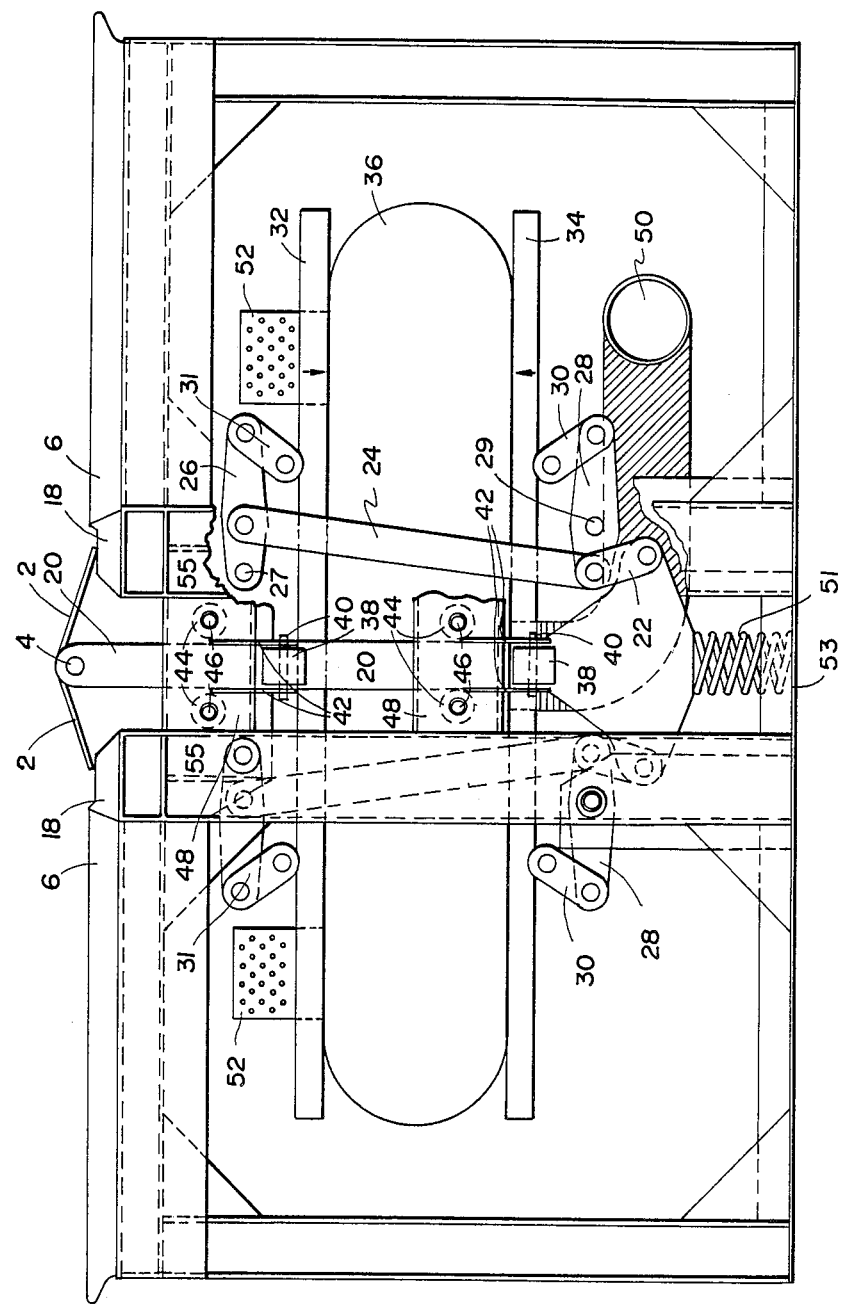
FIG. 3 is a partial, side elevational cross-section view of one embodiment of the fluid compressing unit of the present invention.

According to the invention, a means of compressing fluid is placed under a predetermined surface, such as a roadway, where it is activated by passage of a vehicle thereover. The compressed fluid is propelled into below-ground storage tanks. The compressed fluid so stored is bled off the storage tanks to generating units which operate continuously from the uninterrupted supply of compressed fluid from the storage tanks, thus translating the momentary overpassing of vehicles on the treadle plates into a continuous supply of power.

Electricity produced by the generators may be drawn upon directly for public or residential use. The power may further be directed to storage batteries and may, more particularly, be stored in batteries designed to power electric automobiles. These batteries may be charged at points along highways for the convenient exchange by motorists of their discharged batteries for freshly charged batteries.

The working fluid used is preferably air, but may also be other gases or a liquid, including water.

The significant feature of the invention is the means of translating the slight amount of downward movement provided by the overpassing vehicle into increased compression movement through a series of linkages and fulcrums. The leveraging of downward force allows for the treadle plates to be only minimally raised above the roadway surface. By varying the leveraging, the compression means may be worked by a variety of forms of objects overpassing the treadle plates. In some instances, the mere weight of pedestrians may work the compression means. In its general application, on highways, the invention may be applied to slow or fast areas of traffic. Similarly, the invention may be applied to slow or fast areas of rail traffic.

The treadle plates which receive the downward force elevated above the roadway are capable of vertical travel of various distances as the applied situation allows and as need requires. However, with vertical travel represented as 100 percent, 66 percent of the travel is represented by the treadle plates' elevational level above the road surface and 33 percent is represented by travel falling below the surface. As applying these percentages, for example, the treadle plates are preferably raised approximately two inches above the road's surface at rest, and when a vehicle overpasses, the treadle plates are pressed downwardly and fall below the surface by approximately one inch.

In the preferred embodiment of the invention, the compressing means consists of one or more fluid bladders compressed by an upper and lower pressure plate. The number, shape and placement of the bladders may be as required to cause maximum expulsion of fluid therefrom, with the bladders generally of horizontal shape lying substantially flat against the lower pressure plate. On the overpassing of the vehicle, a vertical shaft is pressed downwardly. Vertical movement is separated into two parts, a downward motion pressure on top of the bladders, and an upward motion pressing underneath the bladders. Through leveraging and the upper and lower plates, the 100 percent of travel of the treadle plates is translated into 800 percent of movement of compression on the bladders. Again using the preferred three inches of treadle plate travel, 24 inches of movement is generated by the vertical force of the overpassing vehicle. Of course, by manipulating the leverage, the compression on the bladder may be increased or decreased as need requires.

The bladder or bladders may be made of a variety of materials in a variety of forms. Preferably the material may be an elastomer supported by a skeleton of a semi-rigid polymer, the application and construction of which is known to those skilled in the art.

Another embodiment of the compressor discloses a plurality of conventional pistons for compressing fluid taken in through the intake and expelled through the exhaust outlet. The length of travel of the pistons may be adjusted according to the placement of the levers and adjustment of the linkage. This embodiment is provided for recapturing energy of heavy vehicles such as trains or subway vehicles.

The apparatus including the arrangement of the treadle plates in relation to the holding tanks and generating means, and the designs of the bladders and piston compression means are further illustrated by the following discussion of the features as depicted by the figures.

FIG. 1 is a combined side elevational view and schematic indicating the relationship of the overpassing vehicles, the highway, and the position of the invention relative to these elements. Vehicles 19, riding on highway 6, overpass treadle plates 2, which plates are forced downwardly by the overpassing weight. In dropping downwardly, treadle plates 2 compress bladder 36, driving compressed fluid through exhaust valve 50. Springs 51, which slightly resist the weight of overpassing vehicles 19, return treadle plates 2 to their resting positions. In so doing, a fluid is drawn back into bladder 36 through intake valve 52.

The compressed fluid is stored in storage tanks 10, to be drawn upon by a motor or turbine means 13 which, in turn, drives generator 14 creating electricity carried away by power lines 16 to power grid 11.

FIG. 2 is a combined top and schematic view of elements underlying the invention, specifically the treadle plates and the vehicle surface and the relation of these elements to below-surface fluid lines, storage tanks and the generating means. As shown, treadle plates 2 are hinged at hinge point 4, with the treadle plates communicating with highway 6. The compressed fluid is expelled from the compressor means through exhaust lines 7 through one-way inlet valve 8 which allows for storage of the compressed fluid in storage tanks 10.

As allowed or needed, the compressed fluid is driven from storage tanks 10 through a one-way outlet valve 9 into fluid line 12 which passes the compressed fluid into turbine 13 or similar means to turn turbine generator 14.

The current generated by turbine generator 14 is carried away either to a power grid for direct use via power lines 16 or to storage battery station 17.

Generally, FIG. 2 illustrates an outline for the method of the invention, which includes the process for compressing, and storing compressed fluid, and for utilizing the compressed fluid and the production of electricity, and all the fluid lines for transporting the compressed or decompressed fluid, as the case may be.

FIG. 3 is a partial, side elevational cross-section of one embodiment of the means for compressing fluid of the present invention. Elevated slightly above highway 6, the treadle plates 2, which move slidingly along base mounts 18 supported by columns 55, are hingedly fixed at hinge point 4 onto vertically moving shafts 20. On the passage of a vehicle over treadle plates 2, vertically moving shafts 20 move downwardly against and directed by outer rollers 38, which are fitted to outer roller frames 42 by outer roller frame pins 40, and side rollers 44, which are fitted to side roller frames 48 by side roller pins 46. As vertical shafts 20 move downwardly, they pull on pivotally fitted connecting links 22, which in turn pull down lower levers 28, fixed pivotally to lower fulcrums 29, drawing lower connecting arms 30 and pushing lower pressure plate 34 upward. At the same time, arms 24, also fitted to connecting links 22, pull upper levers 26 downward, pivoting on upper fulcrums 27, and, by means of upper connecting arms 31, press downwardly on upper pressure plate 32.

When upper pressure plate 32 is pulled downwardly and lower pressure plate 34 is pushed upwardly, compressed fluid is expelled from bladder 36 through one-way exhaust valves 50 and into the storage tank (not shown). Returning, the decompressed fluid is received into bladder 36 through one-way intake valves 52.

Springs 51, fitted between the bases of vertical shafts 20 and the floor of trough 53, act to slightly resist the downward force acting on treadle plates 2 and to force the return of the device to its resting position.

Figure 4:
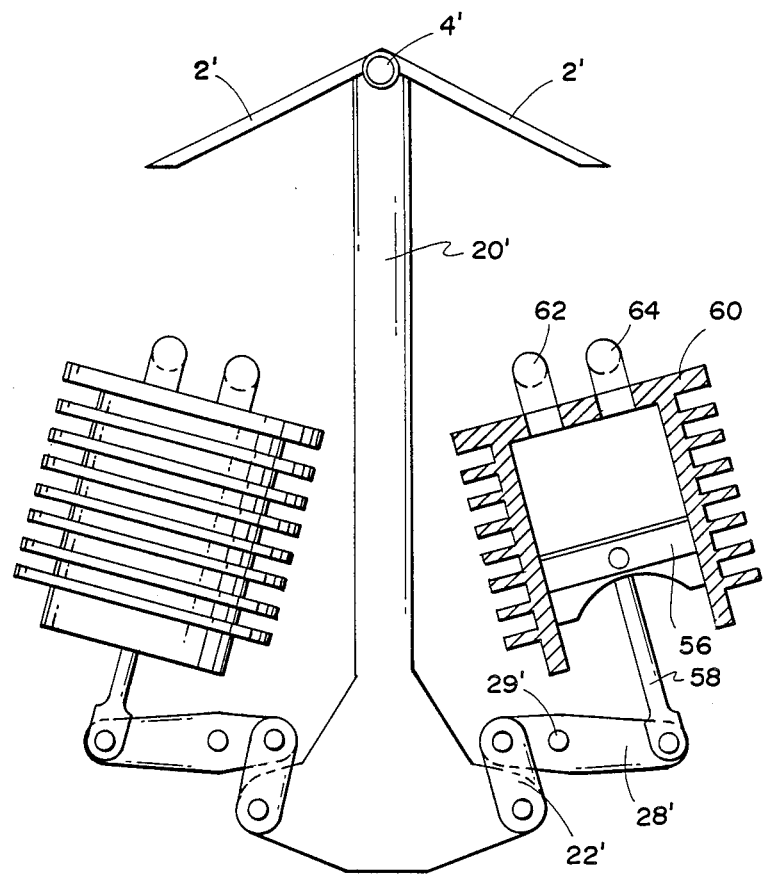
FIG. 4 is a partial, side elevational cross-section view of another embodiment of the fluid compressing unit of the present invention.

FIG. 4 illustrates a partial, side elevational cross-section view of another embodiment of a compression means. When a vehicle overpasses treadle plates 2', which are fixed to vertical shaft 20' at hinge point 4', the downward movement of vertical shafts 20' pull connecting links 22' downward, causing levers 28' to pivot on fulcrums 29', transferring compressing motion to pistons 56 through connecting rods 58. As pistons 56 move to decrease the volume of space in cylinders 60, the fluid is compressed within and is forced out through one-way exhaust valves 64. After a vehicle passes over treadle plates 2' releasing downward pressure on shafts 20', the compressing force on pistons 56 is removed, and fluid is drawn into cylinders 60 by the vacuum thereby created through one-way intake valves 62.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

I claim:

1. An apparatus for generating energy by utilizing the weight of vehicles moving on a predetermined surface, comprising:

one or more bladders containing a fluid;
   a one-way intake value coupled to said bladder for allowing one-way intake of a working fluid into said bladder;
   a one-way exhaust valve coupled to said bladder for allowing one-way exhaust of said working fluid from said bladder;
   a pair of vertically movable, parallel pressure plates comprising an upper plate and a lower plate with said bladder fitted therebetween;
   a pair of treadle plates operably interconnected with said predetermined surface, coupled together hingedly at a hinged point defining a position elevated above said predetermined surface;
   a vertical shaft capable of vertical movement, being pivotally connected to said hinged point of said treadle plates at the uppermost point of said shaft;
   a plurality of connecting links being pivotally connected to said vertical shaft, and which are pivotally fitted to lower levers operably mounted on lower fulcrums, with said lower levers pivotally connected by lower connecting arms with said lower plate;
   a plurality of arms which are pivotally fitted to said connecting links at the lowest portions of said arms and which are pivotally fitted to upper levers at the uppermost portions of said arms, said upper levers being operably mounted on upper fulcrums and pivotally connected to said upper plate by means of a plurality of upper connecting arms;
   compressible spring means fitted to the base of said vertical shaft for slightly resisting downward vertical movement;
   means for storing pressurized working fluid received from said bladder; and
   means for converting at least a portion of said pressurized working fluid into mechanical or electrical energy.

2. An apparatus for generating energy by utilizing the weight of moving trains or similar vehicles on a highway, which comprises:

a plurality of pistons and cylinders;
   a one-way intake valve coupled to each of said cylinders for allowing the one-way intake of working fluid into each of said cylinders;
   a one-way exhaust valve coupled to each of said cylinders for allowing the one-way exhaust of working fluid from each of said cylinders;
   a pair of treadle plates which communicate with a highway surface, coupled together hingedly with said plates capable of vertical movement relative to the highway;
   one or more vertical shafts capable of vertical movement, pivotally connected with the hinged point of said treadle plates;
   a plurality of connecting links pivotally connected at a point of said vertical shaft, and which are pivotally fitted to lower levers operably mounted on lower fulcrums, with said lower levers pivotally connected by a plurality of connecting rods to said pistons;

compressible spring means fitted to the base of said vertical shaft for slightly resisting downward vertical movement;

means for storing pressurized working fluid received from said cylinders; and means for converting at least a portion of said pressurized working fluid into mechanical or electrical energy.

3. An apparatus according to claim 1, wherein:
each said bladder is composed of a resilient and compressible material.

4. An apparatus according to claim 3, wherein:
said bladder is fitted with a plurality of flexible internal supports which communicate with the interior walls of said bladder.

5. An apparatus according to claim 3, wherein:
said bladder is comprised of a plurality of layers of a resilient and compressible material.

6. An apparatus according to claim 1, wherein:
said means for converting to electrical energy includes a turbine.

7. An apparatus according to claim 1, wherein:
said means for converting to electrical energy comprises a turbine-powered electric generator.

8. An apparatus according to claim 1, wherein:
said working fluid is water.

9. An apparatus according to claim 1, wherein:
said working fluid is a gas.

10. An apparatus according to claim 1, wherein:
said working fluid is an oil.

11. An apparatus according to claim 2, wherein:
said means for converting to electrical energy includes a turbine.

12. An apparatus according to claim 2, wherein:
said means for converting to electrical energy comprises a turbine-powered electric generator.

13. An apparatus according to claim 2, wherein:
said working fluid is water.

14. An apparatus according to claim 2, wherein:
said working fluid is a gas.

15. An apparatus according to claim 1, wherein:
a vertical force sufficient to activate the apparatus is provided by pedestrian traffic passing thereover.

16. An apparatus according to claim 15, wherein:
said vertical force is provided by non-rail highway traffic passing thereover.

17. An apparatus according to claim 2, wherein:
a vertical force sufficient to activate the apparatus is provided by non-rail highway traffic passing thereover.

18. An apparatus according to claim 16, wherein:
said vertical force is provided by rail traffic passing thereover.

19. An apparatus according to claim 17, wherein:
said vertical force is provided by rail traffic passing thereover.

20. An apparatus for generating energy by utilizing the weight of vehicles moving on a predetermined surface, comprising:

one or more treadle plates operably interconnected with said predetermined surface;

compressing means containing a fluid operably interconnected with said treadle plates for receiving the downward force created by said moving vehicles passing over said treadle plates thereby compressing said fluid contained therein;

said compressing means comprising:

one or more bladders containing said fluid;

a pair of vertically movable, parallel pressure plates comprising an upper pressure plate and a lower pressure plate with said bladder fitted therebetween;

means operably connecting said treadle plate(s) with said upper and lower pressure plates, respectively, for imparting upward vertical movement to said lower pressure plate and downward vertical movement to said upper pressure plate when a downward force is applied to said treadle plate(s), whereby said bladder is compressed between said plates; and generating means for receiving said compressed fluid and for utilizing said compressed fluid to generate energy thereby.

21. An apparatus according to claim 20, wherein:
said treadle plate(s) comprise a pair of treadle plates hingedly coupled together at a hinged point defining a position elevated above said predetermined surface.

22. An apparatus according to claim 21, wherein: said connecting means comprises:

a substantially vertical shaft capable of vertical movement, said shaft having an upper end pivotally connected to said hinged point of said treadle plates;

at least one connecting link pivotally connected to said vertical shaft and pivotally fitted to at least one lower lever which is in turn pivotally connected with said lower pressure plate;

at least one arm having one end thereof pivotally connected to said connecting link and the other end thereof pivotally connected to at least one upper lever, said upper lever being pivotally connected to said upper pressure plate; and said apparatus further comprises compressible spring means fitted to the base of said vertical shaft for slightly resisting downward vertical movement thereof.

* * * * *

UNITED STATES PATENT AND TRADEMARK OFFICE
CERTIFICATE OF CORRECTION

PATENT NO. : 4,739,179

DATED : April 19, 1988

INVENTOR(S) : STITES

It is certified that error appears in the above-identified patent and that said Letters Patent is hereby corrected as shown below:

Column 6, line 8 (claim 1, line 5), change "value" to --valve--.

Signed and Sealed this

Twenty-seventh Day of September, 1988

Attest:

DONALD J. QUIGG

Attesting Officer

Commissioner of Patents and Trademarks